United States Patent
Thomas et al.

[11] Patent Number: 5,935,042
[45] Date of Patent: Aug. 10, 1999

[54] ADAPTIVE K-FACTOR TO IMPROVE STALL-TORQUE MANAGEMENT

[75] Inventors: Christopher P. Thomas, West Bloomfield; Kathryn A. Wolfe, Sterling Heights; Bruce H. Teague, Grosse Pointe Park; O. Kent Thiel, Chelsea; Howard W. Krausman, Dexter, all of Mich.

[73] Assignee: Chrysler Corporation, Auburn Hills, Mich.

[21] Appl. No.: 09/080,549

[22] Filed: May 18, 1998

[51] Int. Cl.[6] .................................................. G06G 7/70
[52] U.S. Cl. .............................. 477/110; 477/169; 701/58
[58] Field of Search ................................. 477/166, 169, 477/174, 175, 110; 701/58

[56] References Cited

U.S. PATENT DOCUMENTS

| | | | |
|---|---|---|---|
| 4,535,412 | 8/1985 | Cederquist | 701/58 X |
| 4,875,391 | 10/1989 | Leising et al. | 74/866 |
| 4,968,999 | 11/1990 | Fodale et al. | 364/424.1 |
| 4,969,098 | 11/1990 | Leising et al. | 364/424.1 |
| 4,991,097 | 2/1991 | Fodale et al. | 364/424 |
| 5,265,498 | 11/1993 | Fodale et al. | 74/858 |
| 5,272,630 | 12/1993 | Brown et al. | 701/58 X |
| 5,305,213 | 4/1994 | Boardman et al. | 477/109 |
| 5,468,198 | 11/1995 | Holbrook et al. | 477/143 |
| 5,685,799 | 11/1997 | Vukovich et al. | 477/154 X |
| 5,790,967 | 8/1998 | Kull et al. | 701/58 X |

*Primary Examiner*—Khoi Q. Ta
*Attorney, Agent, or Firm*—Mark P. Calcaterra

[57] ABSTRACT

A method is provided for adaptively determining a torque-related (K-factor) value for a torque converter in a vehicle and providing adaptive torque management to an automatic transmission. The torque-related K-factor value is computed for a given torque converter as a function of engine speed and difference in torque measured with the vehicle operating in idle neutral and drive. The vehicle dynamically learns the K-factor value and manages torque applied to the transmission by limiting the engine output speed as a function of the learned torque-related K-factor and vehicle speed.

13 Claims, 4 Drawing Sheets

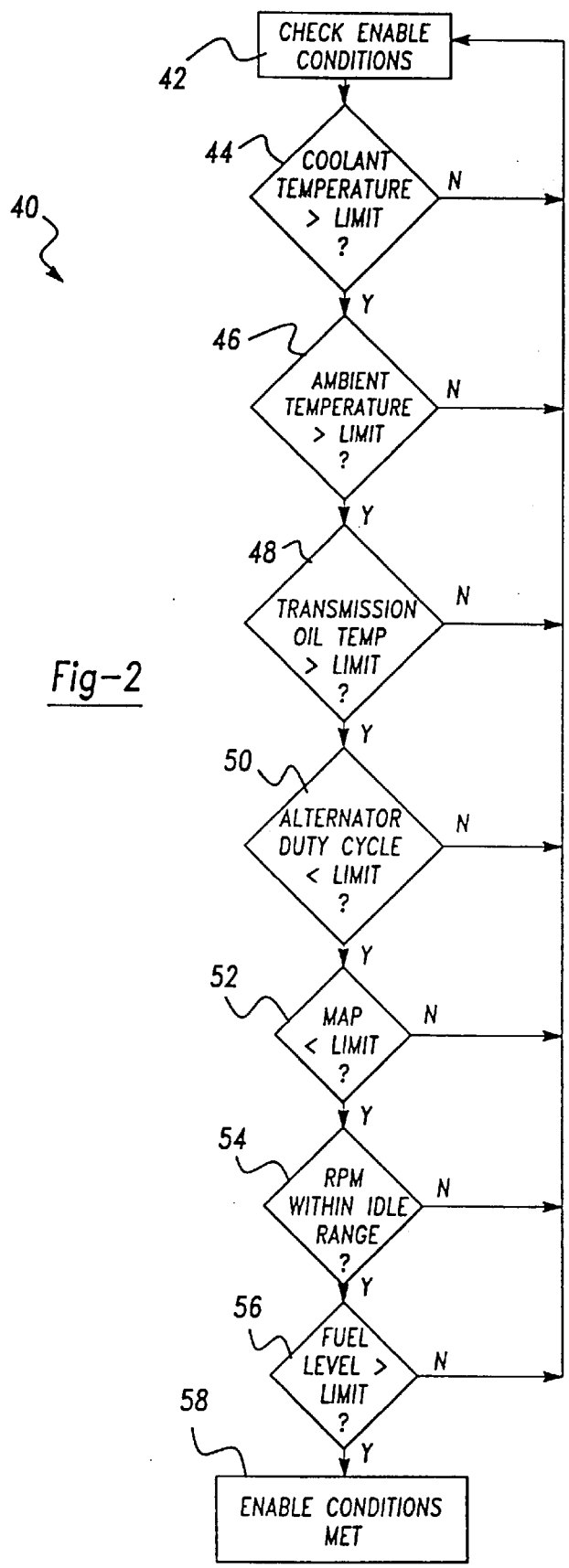

ADAPTIVE K-FACTOR TO IMPROVE STALL-TORQUE MANAGEMENT

BACKGROUND OF THE INVENTION

1. Technical Field

The present invention relates generally to torque management in an automatic transmission primarily intended for motor vehicle use, and more particularly, to a method of adapting to the K-factor value of a torque convertor and providing adaptive stall-torque management for the automatic transmission.

2. Discussion

Generally speaking, a power train is composed of two parts, a power plant such as an internal combustion engine, and some means of transferring the power to the ground to propel the vehicle, which is typically some sort of transmission. Engine torque and speed are converted in the transmission generally in accordance with the tractive-power demand of the vehicle. Automatic transmissions are designed to take control of frictional units, gear ratio selection and gear shifting for effecting gear changes in the transmission. One advanced form of transmission control system has been proposed which would offer the possibility of enabling the automatic transmission to adapt itself to changing conditions and the torque management system to adapt to part-to-part variation. An example of such an electronic controlled automatic transmission system is disclosed in U.S. Pat. No. 4,875,391, entitled "An Electronically-Controlled, Adaptive Automatic Transmission System", issued to Leising et al. One feature of the above-identified patented automatic transmission system is a method of stall torque management which issued into corresponding U.S. Pat. No. 4,991,097, entitled "Method Of Stall Torque Management For An Electronic Automatic Transmission System", to Davis et al. The aforementioned issued patents are hereby incorporated by reference. The patented stall-torque management method disclosed in the above-identified patent reduces the speed of the engine and hence the torque out of the torque converter, reducing the torque into the automatic transmission in response to predetermined conditions existing in the transmission.

The above-identified methods of stall-torque management have worked well to reduce input power from the engine during a stall to improve differential durability. However, known torque management methodologies typically take into consideration an established K-factor value that serves as an indication of a value which will suffice for a certain percentile of all the torque converters that are available. The K-factor of a torque converter has been defined as the engine speed in revolutions-per-minute (RPM) divided by the square root of the engine torque output. The K-factor value therefore provides a relative indication of the efficiency of the torque converter. In the past, torque management control utilized an established K-factor, which was usually established based on test data accumulated from sampled torque converters. However, the actual K-factor value varies among individual torque converters, because there are usually manufacturing variations. For example, torque converters established with a 180K nominal K-factor value may vary from 145K to 215K, depending on manufacturing quality. By assuming the established nominal K-factor value, variance in actual performance results. If the torque management manages to a 90th percentile torque converter, 90% of vehicles equipped with the torque converters may be over-managed, while the remaining 10% of vehicles equipped with torque converters may be under-managed. In addition, the K-factor for a given torque converter may vary over time due to wear and tear of the torque converters. Known approaches have not adapted to changes which may occur in an individual torque converter over time.

It is, therefore, one object of the present invention to provide for a method of providing enhanced torque management in an automatic transmission by adapting to the characteristics of an individual torque converter.

It is another object of the present invention to provide for an improved method of adaptively determining the K-factor of a torque converter and managing engine speed to obtain a managed torque from the automatic transmission.

It is yet another object of the present invention to provide for an adaptive K-factor for individual torque converters, which takes into consideration differences amongst a plurality of torque converters and changes to an individual torque converter that may occur over time, such that torque can be managed to prevent transmission components from breaking, while ensuring adequate performance of the vehicle.

SUMMARY OF THE INVENTION

To achieve the foregoing objectives, the present invention is a method of adaptively managing torque applied to an automatic transmission in a vehicle. The torque management method includes adaptively determining a K-factor value for a torque converter of the automatic transmission. The K-factor value may be computed as a function of engine speed and the difference in torque measured at the output of the torque converter in neutral and in drive. Accordingly, the vehicle dynamically learns the K-factor value for the corresponding torque converter. The learned adaptive K-factor value is updated and used to manage the torque applied to the transmission. Torque management is accomplished by limiting output speed of the engine as a function of vehicle speed and the learned K-factor. Accordingly, torque applied to the transmission is adaptively controlled, especially at low vehicle speed with the presence of high engine speed so as to prevent damage to transmission components, while maintaining good vehicle performance.

BRIEF DESCRIPTION OF THE DRAWINGS

Other objects and advantages of the present invention will become apparent to those skilled in the art upon reading the following detailed description and upon reference to the drawings in which:

FIG. 2 is a flow diagram illustrating a number of enable conditions that are required to be met prior to learning torque;

DETAILED DESCRIPTION OF THE PREFERRED EMBODIMENT

Figure 1:
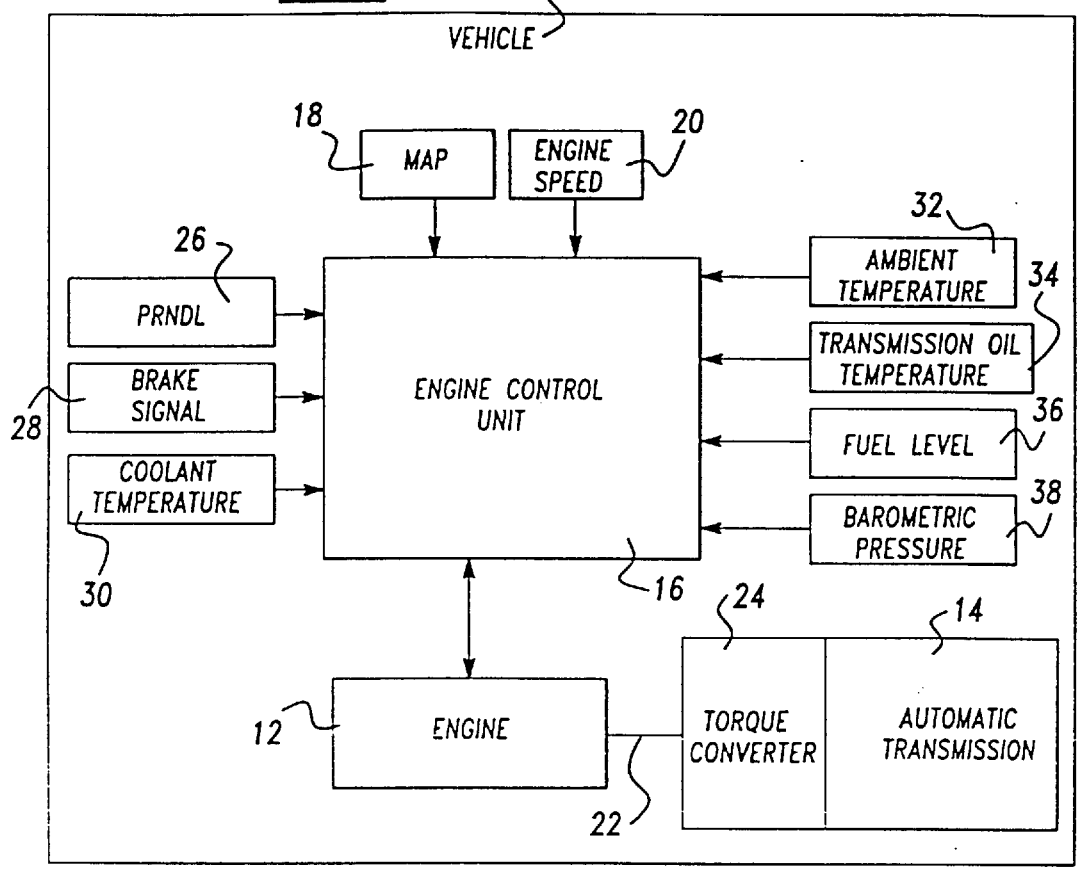
FIG. 1 is a block diagram generally illustrating some of the main components of an automotive vehicle.

Turning now to FIG. 1, an automotive vehicle is generally shown depicted as block 10 and includes some of the main components of automotive vehicle 10. Vehicle 10 is shown to include an internal combustion engine 12 with an engine output shaft 22 coupled to the automatic transmission 14. The automatic transmission 14 includes a torque converter 24 that couples the input member of transmission 14 to the output shaft 22 of engine 12 and serves to multiply and transmit engine torque to the transmission 14. Accordingly, the engine 12 applies torque via the torque converter to the automatic transmission 14 wherein the torque is translated through gear shifts to move the vehicle 10. The automatic transmission 14 may include any electronically controlled automatic transmission such as that described in U.S. Pat. No. 4,875,391 or a hydraulically controlled transmission.

Vehicle 10 further includes an engine control unit (ECU) 16 which includes a microprocessor-based controller as is generally known in the art for controlling operation of the engine 12. The engine control unit 16 receives numerous inputs which include manifold absolute pressure (MAP) 18 and engine speed (RPM) 20. In addition, engine control unit 16 receives signals indicative of the manually selectable gear shift (PRNDL) 26, brake 28, coolant temperature 30, ambient temperature 32, transmission oil temperature 34, fuel level 36 and barometric pressure 38. The engine control unit 16 processes these and other input signals in accordance with programmed engine control routines so as to control the operation of the engine 12. The engine control unit 16 further controls torque management in accordance with the present invention as is explained hereinafter.

The torque converter 24 has operational characteristics which may vary amongst available torque converters. These varying operational characteristics are due to deviations in manufacturing tolerances, and also due to variations that may occur over time due to wear-and-tear on components of the torque converter. Differences in torque converter characteristics may lead to a torque multiplication factor that may vary amongst different available torque converters. Despite such operating variations, the vehicle 10 learns an adaptive K-factor value for the individual torque converter in accordance with the present invention. The learned K-factor is then used to provide adaptive torque management, which effectively manages the output torque produced by the torque converter in order to control the torque applied to components of the automatic transmission. Torque management is needed at low vehicle speeds with the presence of high enough engine speed, where the engine may otherwise have sufficient torque to drive the torque converter to a high enough speed such that the output torque is high enough to possibly break transmission components such as the differential, driveshafts, etc.

To accomplish torque management, the engine control unit 16 limits the engine output speed at the output shaft 22 as a function of the learned adaptive K-factor value for the individual torque converter 24 employed with the automatic transmission 14. Engine speed is limited to a maximum allowed speed based on the learned adaptive K-factor and the determined vehicle speed as will be described herein. By learning the adaptive K-factor of the torque converter 24, vehicle 10 is able to manage the torque output from the torque converter 24 so as to maintain optimum vehicle performance, while avoiding the risk of damaging components in the transmission.

Referring to FIG. 2, an enable conditions methodology 40 is provided which checks for a number of enable conditions prior to learning torque measurement in connection with the method for determining the K-factor of the torque converter. The enable conditions methodology 40 begins at block 42 and initiates a check for enable conditions. As the first enable conditions check, decision block 44 checks whether the coolant temperature is greater than a predetermined limit and, if so, proceeds to decision block 46. Decision block 46 checks whether ambient temperature is greater than a predetermined limit. Next, decision block 48 checks whether the transmission oil temperature is greater than a predetermined limit. Decision block 50 checks for whether the alternator duty cycle is less than a predetermined limit. Decision block 52 checks whether the manifold absolute pressure (MAP) is less than a predetermined limit. Decision block 54 checks whether the engine speed (RPM) is within an idle range. Decision block 56 checks whether the fuel level is greater than a predetermined limit. If all conditions checked for with decision blocks 44–56 are satisfactory, methodology 40 proceeds to block 58 which indicates that the enable conditions are met. However, if one or more of the conditions checked in any of decision blocks 44–56 are not satisfactory, methodology 40 proceeds back to begin block 42 to repeat the check of the enable conditions.

Figure 3A:
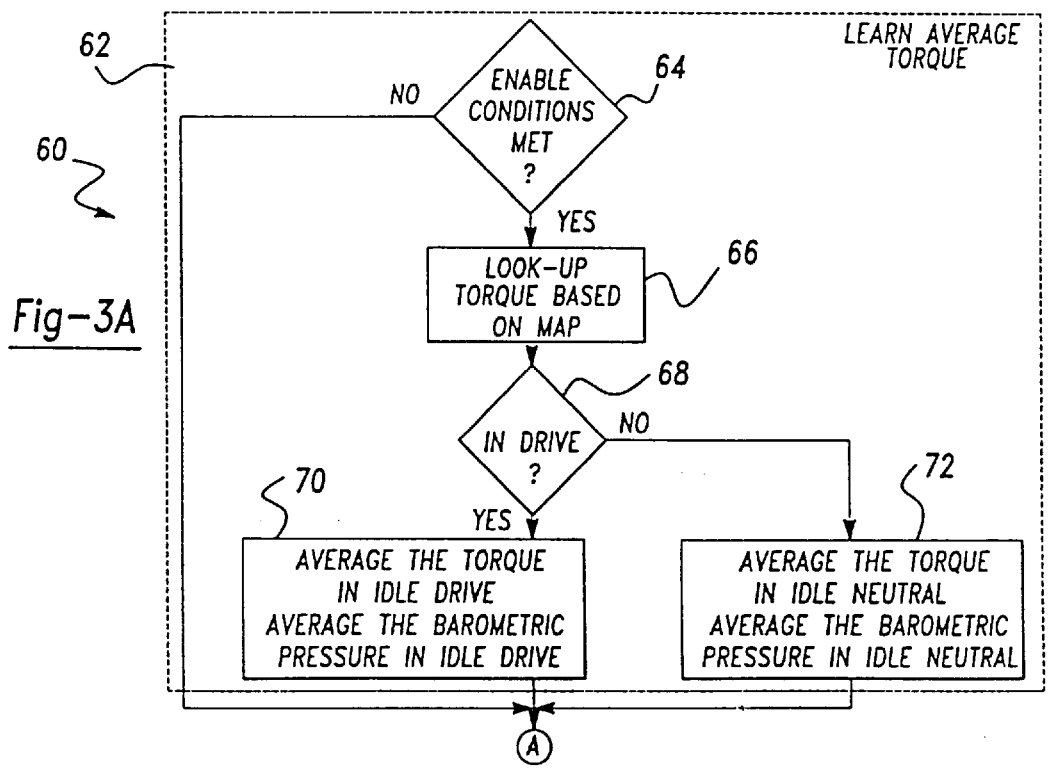
FIGS. 3A—3C are interconnected flow diagrams illustrating a methodology for adaptively determining a K-factor value for an individual torque converter in accordance with the present invention and managing output torque to the transmission.
Figure 3B:
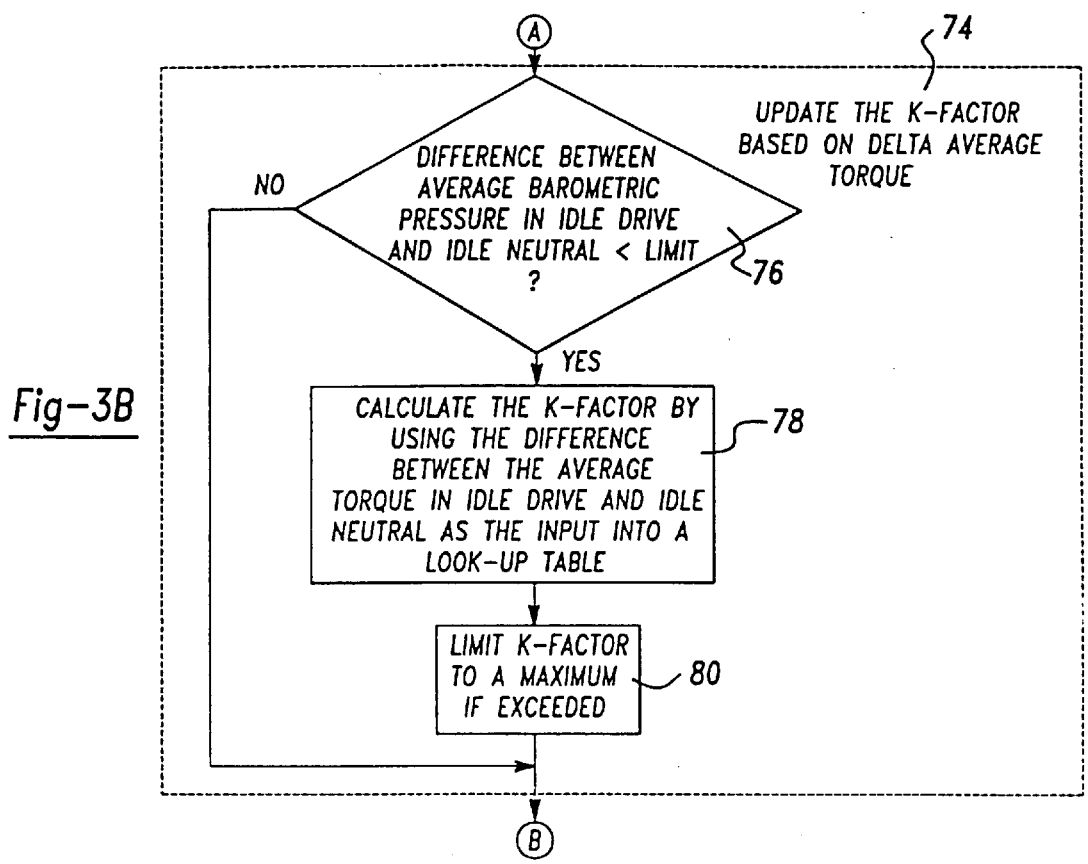
Figure 3C:
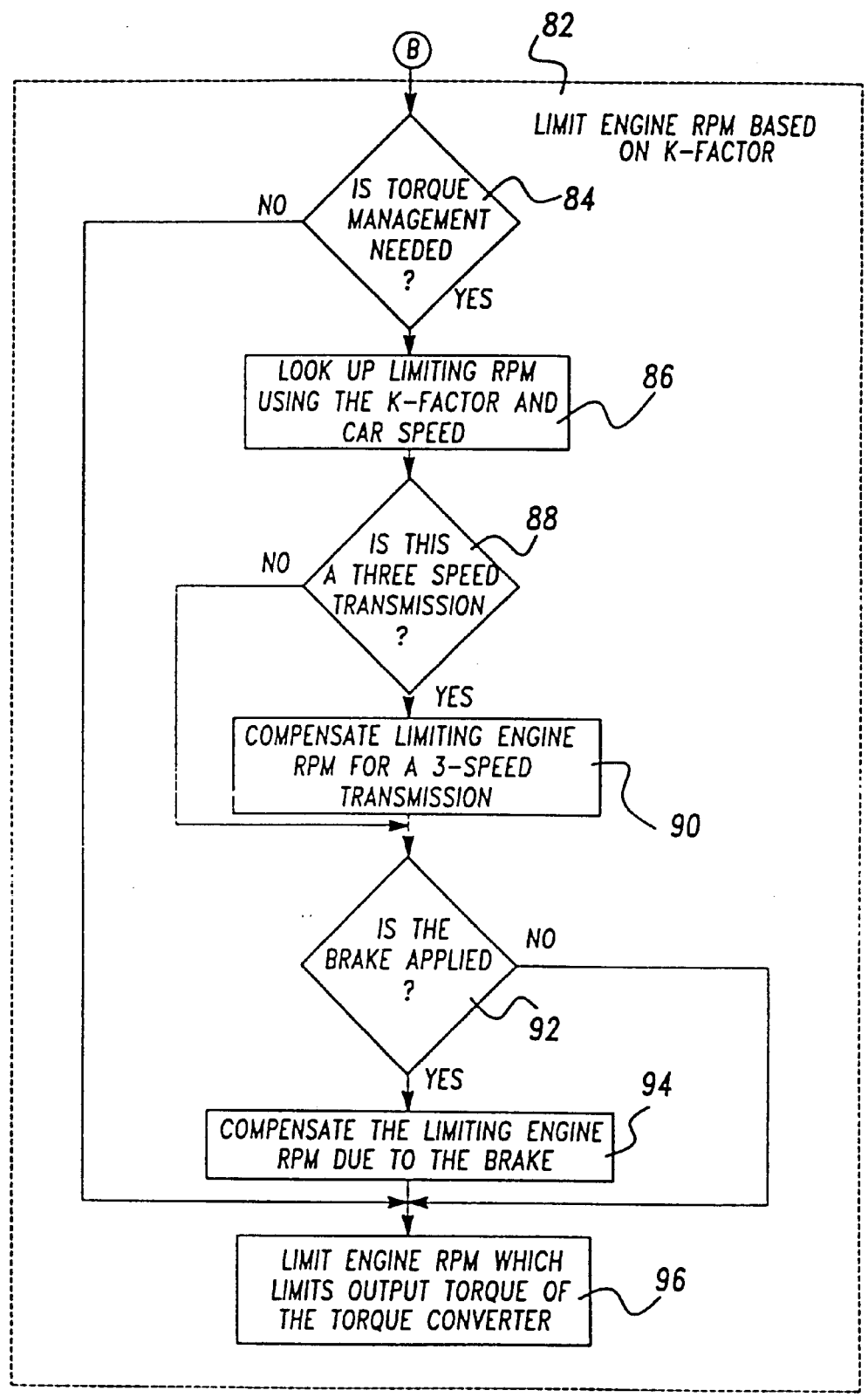

FIGS. 3A–3C illustrate a methodology 60 of learning an adaptive K-factor for the torque converter and managing engine torque output applied to the automatic transmission of the vehicle. Referring to FIG. 3A, methodology 60 includes a routine for learning an average torque as shown by dashed box 62. The average torque learning routine 62 of methodology 60 begins with decision block 64 which checks whether the enable conditions are met. The enable conditions check was discussed above with reference to FIG. 2. If the enable conditions are met, methodology 60 proceeds to look-up torque based on manifold pressure (MAP) pursuant to block 66, and thereafter proceeds to decision block 68 to check whether the vehicle transmission is in "drive". If the vehicle transmission is currently in "drive", methodology 60 proceeds to block 70 to average the torque in "idle drive" and to average the barometric pressure in "idle drive". If the vehicle transmission is not in "drive", methodology 60 proceeds to block 52 to average the torque in "idle neutral" and also to average the barometric pressure in "idle neutral". Accordingly, average values of torque and barometric pressure are learned when the transmission is in "idle drive" and also when the transmission is in "idle neutral". The average values of torque and barometric pressure are calculated over numerous torque and barometric pressure measurements.

Once the average torque and average barometric pressure values are learned, methodology 60 proceeds to update the torque converter K-factor based on a delta average torque as provided in the routine shown by dashed box 74 in FIG. 3B. The K-factor update routine 74 initially checks whether the difference between the average barometric pressure in "idle drive" and the average barometric pressure in "idle neutral" is less than a predetermined limit as provided in decision block 76. The difference in average barometric pressure is used to determine whether altitude changes may adversely effect the K-factor computation. Next, methodology 60 calculates the K-factor by using the difference between the average torque measured in "idle drive" and the average torque measured in "idle neutral". The K-factor is then preferably input to a look-up table as is indicated in block 78. Methodology 60 will limit the K-factor value to a maximum value if the updated K-factor exceeds a maximum value, as provided in block 80.

The K-factor value for the torque converter is computed as a function of engine output speed and the difference in average torque at "idle drive" and average torque at "idle neutral" as provided in the following equation:

$$K\text{-factor} = \frac{\text{EngineSpeedRPM}}{\sqrt{\text{Torque}_{ID} - \text{Torque}_{IN}}}$$

Wherein, $\text{Torque}_{ID}$ represents the average torque measured with the vehicle operating at "idle drive" and $\text{Torque}_{IN}$ represents the average torque measured with the vehicle operating at "idle neutral". From the long term computation of mean average of torque calculated in "idle neutral" and "idle drive", the difference is taken to provide a delta torque. According to one embodiment, the K-factor is determined from a look-up table as a function of engine speed and the mathematical square root of the delta torque. Alternately, a mathematical computation of the K-factor can be provided within the engine control unit or via processing in another controller. However, the use of a look-up table advantageously reduces the overall computations that are required which reduces processing time.

With particular reference to FIG. 3C, methodology 60 proceeds to limit the engine speed (RPM) based on the calculated K-factor as provided in the routine shown in dashed box 82. Decision block 84 checks whether torque management is needed. If torque management is needed, methodology 60 proceeds to block 86 to look-up a limiting engine speed (RPM) using the learned K-factor and the current vehicle speed. Next, methodology 60 checks whether the transmission is a three-speed transmission, as provided in decision block 88, and if so proceeds to block 90 to compensate the limiting engine speed (RPM) for a three-speed transmission. If the transmission is not a three-speed transmission, or if the compensation for a three-speed transmission is complete, methodology 60 proceeds to decision block 92 to check if the brake is applied. If the brake is applied, methodology 60 compensates the limiting engine speed (RPM) due to the brake as provided in block 94. If the brake is not applied, no brake compensation is provided and decision block 92 proceeds to block 96. Thereafter, methodology 60 proceeds to limit the engine output speed (RPM) to a maximum speed which limits output torque of the torque converter as provided in block 96.

Accordingly, the adaptive routine of methodology 60 determines the learned K-factor of the torque converter to improve the stall-torque management. This is accomplished in such a way as to provide adequate transmission protection for lower tolerance torque converters, while improving vehicle performance for higher tolerance converters by using the learned operational characteristics for each individual torque converter. This dynamic method of torque management learns characteristics particular to the individual torque converter, and manages torque to the transmission to prevent or reduce the conventional problems associated with overmanaging and undermanaging transmission performance with varying performance torque converters.

Figure 4:
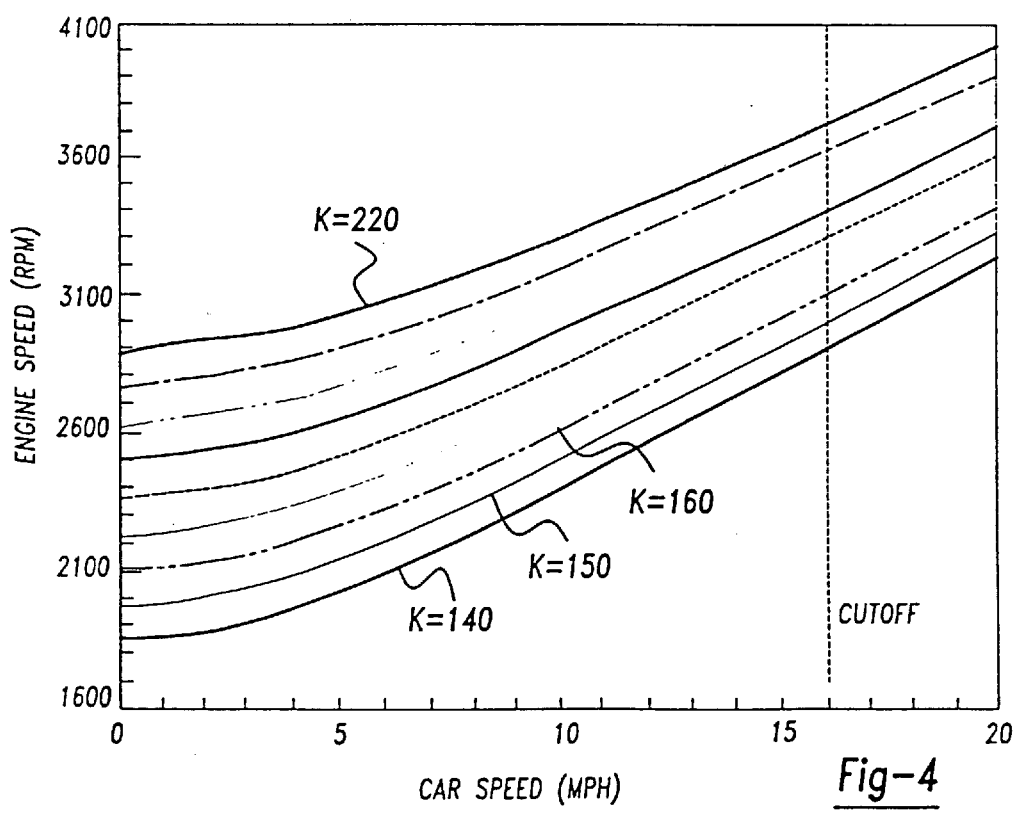
FIG. 4 is a graph illustrating examples of various cut-off curves for limiting engine speed as a function of vehicle speed for a plurality of different K-factor values.

An illustration of a number of engine speed limit curves corresponding to a plurality of different K-factor values for various torque converters is provided in FIG. 4. As shown, at any given K-factor provided, the learned K-factor provides a maximum engine speed (RPM) that is allowed for each learned K-factor value as a function of the car speed. A theoretical engine speed limit surface is provided based on a calculation of experimental data on different torque converters. Based on the learned K-factor at various vehicle speeds, the engine speed limit surface provides an indication of the maximum engine speed that is allowed to achieve adequate torque management.

As one example, a K-factor value of K=140 with a vehicle speed of ten miles-per-hour limits the maximum engine speed to approximately 2400 revolutions-per-minute (RPM). In contrast, a K-factor of K=160 at a vehicle speed of ten miles-per hour will limit the maximum allowable engine speed to approximately 2550 RPM. Accordingly, the torque management method looks to the learned adaptive K-factor and current vehicle speed to limit the engine speed to a maximum value dependent on the K-factor and vehicle speed.

In addition, the torque management of the present invention is preferably utilized for low vehicle speeds such as speeds of zero to sixteen miles per hour, for example. Torque management is preferably limited to low vehicle speed where potential damage to transmission components at high engine speeds is more likely. It should be appreciated that various vehicle speed limits may be utilized as necessary, and that various maximum engine speed limits may be used without departing from the principles of the present invention.

While a specific embodiment of the invention has been shown and described in detail to illustrate the principles of the present invention, it should be understood that the invention may be embodied otherwise without departing from such principles. For example, one skilled in the art will readily recognize from such discussion and from the accompanying drawings that various changes, modifications and variations can be made without departing from the spirit and scope of the present invention as described in the following claims.

What is claimed is:

1. A method of controlling engine torque produced by a vehicle engine and applied to a transmission of a vehicle in response to learned conditions, said method comprising the steps of:

detecting engine speed;

determining torque applied to the transmission;

learning an adaptive torque-related value indicative of torque conversion characteristics in the transmission; and managing torque applied to the automatic transmission as a function of the learned adaptive value.

2. The method as defined in claim 1 wherein the step of learning an adaptive torque-related value comprises the steps of:

determining a first average torque value input to the transmission while the vehicle is operating in idle neutral;

determining a second average torque value input to the transmission while the vehicle is operating in idle drive; and computing the adaptive torque-related value as a function of engine speed and difference in the determined first and second average torque values.

3. The method as defined in claim 2 wherein said adaptive torque-related value is further computed as a function of engine speed divided by the square root of the difference in the first and second average torque values.

4. The method as defined in claim 3 wherein said learned adaptive torque-related value is a k-factor value of a torque converter.

5. The method as defined in claim 1 wherein said step of managing torque includes limiting engine speed to a maximum allowed value as a function of the learned adaptive torque-related value and vehicle speed.

6. The method as defined in claim 1 wherein the learned adaptive torque-related value indicates the characteristics of a torque converter in a transmission.

7. A method of controlling engine torque produced by a vehicle engine and applied to an automatic transmission of a vehicle via a torque converter, said method comprising the steps of:

detecting engine speed;

determining a first torque value output from the torque converter while the vehicle is operated in neutral;

determining a second torque value output from the torque converter while the vehicle is operated in drive;

computing a torque-related value of the torque converter as a function of detected engine speed and the first and second determined torque values; and limiting engine output speed to a maximum speed as a function of the determined torque-related value and vehicle speed so as to manage the output engine torque applied to the transmission.

8. The method as defined in claim 7 wherein said first torque value is determined while the engine is idling in neutral, and the second torque value is determined while the engine is idling in drive.

9. The method as defined in claim 7 wherein said torque-related value is computed as a function of engine speed divided by the square root of the difference in the first and second determined torque values.

10. The method as defined in claim 7 wherein said first and second torque values are average values.

11. The method as defined in claim 7 wherein said learned adaptive torque-related value is a k-factor value for a torque converter.

12. In a vehicle having an engine for producing an engine torque and an automatic transmission, the automatic transmission including a torque converter for transmitting the engine torque to the automatic transmission, a method of controlling the engine torque applied to the transmission comprising the steps of:

detecting vehicle speed;

detecting engine speed;

detecting manifold absolute pressure;

determining a first average torque value output from the torque converter while the vehicle is operated in idle neutral;

determining a second average torque value output from the torque converter while the vehicle is operated in idle drive;

computing a torque-related value of the torque converter as a function of detected engine speed and the first and second determined average torque values; and limiting engine output speed to a maximum speed as a function of the determined torque-related value and vehicle speed so as to manage the output engine torque applied to the transmission.

13. The method as defined in claim 12 wherein said torque-related value is computed as a function of engine speed divided by the square root of the difference in the first and second determined torque values.

\* \* \* \* \*